United States Patent Office 2,999,082
Patented Sept. 5, 1961

2,999,082
PRODUCTION OF POLYCONDENSATION
PRODUCTS
Hans Holtschmidt, Koln-Stammheim, and Erwin Müller and Otto Bayer, Leverkusen, Germany, assignors, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware
No Drawing. Filed Sept. 2, 1958, Ser. No. 758,572
Claims priority, application Germany Sept. 7, 1957
14 Claims. (Cl. 260—79)

This invention relates generally to the production of polycondensation products and, more particularly, to a novel and improved method for producing polythioethers having terminal hydroxyl groups and to the resulting product obtained therefrom.

High molecular weight polyethers and polythioethers having terminal hydroxyl groups are old and well known in the art. The high molecular weight polyethers having terminal hydroxyl groups have been prepared heretofore by several different processes. These high molecular weight polyethers having terminal hydroxyl groups are produced by joining at least two monomeric compounds together through an oxygen bridge. The oxygen bridge is an ether linkage and hence when several of these oxygen bridges are present in a molecule the compound is called a polyether. One such method for producing polyethers having terminal hydroxyl groups is to polymerize a suitable monomeric cyclic ether such as, for example, ethylene oxide, propylene oxide, trimethylene oxide, tetrahydrofuran and the like under the influence of a suitable catalyst. The polyethers having terminal hydroxyl groups may also be prepared by oxyalkylation of polyhydric alcohols with alkylene oxides under the influence of suitable catalyst. Alkylene oxides which have been used heretofore to produce polyethers having terminal hydroxyl groups generally have been the low molecular weight alkylene oxides. Examples of such low molecular weight alkylene oxides are ethylene oxide, propylene oxide, butylene oxide and the like. Examples of such suitable polyhydric alcohols are ethylene glycol, propylene glycol, butylene glycol and the like. These high molecular weight polyethers having terminal hydroxyl groups contain only carbon and oxygen atoms.

The high molecular weight polythioethers having terminal hydroxyl groups have likewise been produced heretofore by several different processes. The polythioethers differ from the polyethers in having sulphur bridges in place of or in addition to the oxygen bridges. The sulphur bridges are in general sulphur ether groups. That is to say a bridge is formed where the sulphur atom is the bridging member in place of oxygen atom of the ether group. The polythioethers having terminal hydroxyl groups have been produced heretofore by oxyalkylation of hydroxyalkyl sulphides or hydroxythioethers with alkylene oxides by heating in the presence of suitable catalyst. Examples of such suitable hydroxythioethers are hydroxymethylthioether glycol, hydroxyethyl thioether glycol, hydroxypropyl thioether glycol and the like. Examples of such suitable alkylene oxides are those which have heretofore been used to produce the polyethers having terminal hydroxyl groups. Examples of such suitable catalysts are halogen acids, such as, hydrochloric and hydrobromic, sulfuric acid and phosphoric acid. The polythioethers having terminal hydroxyl groups produced according to the above process have only oxygen, sulphur, carbon and hydrogen atoms present in the molecule.

It has likewise been found that polythioethers having terminal hydroxyl groups containing both oxygen and sulphur bridges may be produced by condensing bis-beta oxyalkyl sulphides. The bis-beta oxyalkyl sulphides which may be condensed may be the same or different depending on the desired polythioether which the operator wishes to produce. This condensation like the oxyalkylation reaction must be carried out in an acid medium. The acid medium is necessary because the reaction proceeds by way of a cyclic sulphonium complex mechanism as shown in J. Am. Chem. Soc. 74, 4076 (1952). It has not been possible heretofore to produce polythioethers having terminal hydroxyl groups and which have nitrogen bridges as well as sulphur and oxygen bridges because the amine component used to form the nitrogen bridge neutralizes the acid catalyst and the condensation reaction ceases. The presence of even small amounts of amines such as, primary, secondary, and tertiary aliphatic and aromatic amines makes condensation impossible. Furthermore, if more than a catalytic amount of acid is added so that acid is present to catalyze the condensation reaction, the amine will not enter into the reaction in its neutralized state.

It is therefore an object of this invention to provide an improved process for the production of high molecular weight polycondensation products having sulfur bridges. Another object of the invention is to provide a process for production of high molecular weight condensation products having nitrogen bridges. A further object of the invention is to provide a method for making polythioethers having nitrogen and sulfur bridges. A still further object is to provide new and novel high molecular weight condensation compounds having terminal hydroxyl groups. A more specific object is to provide a method for making a polythioether having terminal hydroxyl groups and nitrogen and sulfur bridges. Another object is to provide a method for making a polythioether having terminal amino groups and nitrogen and sulfur bridges.

Generally speaking, the foregoing objects as well as others are accomplished in accordance with this invention by reacting monovalent or polyvalent aromatic amines or their secondary or tertiary amine oxyalkylation products with bis-beta-oxyalkyl sulphides in the presence of a dehydration catalyst at temperatures above about 120° C. It has been found that undesirable neutralization does not take place in the condensation provided that only aromatic amines are used in combination with the dehydration catalyst. The starting materials may be used in any desired proportions. That is to say, the aromatic amines and bis-beta oxyalkyl sulphides may be used in equivalent amounts or the bis-beta-oxyalkyl sulphides may be used in an excess amount or less than an equivalent amount. By using an excess amount of bis-beta-oxyalkyl sulphides polythioethers having terminal hydroxyl groups and a higher molecular weight may be produced. By using an excess amount of aromatic amines, polythioethers having terminal amino groups, which may be primary, secondary or tertiary amino groups, can be produced.

The polycondensation reaction products produced according to this invention contain nitrogen bridges. In addition to the nitrogen bridges the reaction products also contain sulphur bridges. The reaction products may also contain oxygen bridges. By the proper selection of the amine component a polycondensation reaction product may be produced which contains either sulfur and nitrogen bridges or oxygen, sulphur and nitrogen bridges. The polycondensation products preferably contain terminal hydroxyl groups, but instead of or besides the hydroxyl groups the product can have terminal primary, secondary or tertiary amino groups.

The polycondensation reaction product containing sulphur and nitrogen bridges may be produced by reacting aromatic compounds having free primary amine groups with bis-beta-oxyalkyl sulphides. The reaction is carried out in the presence of a dehydration catalyst and at elevated temperatures. The polycondensation reaction product will be a basic reacting condensation product containing sulphur and nitrogen bridges linking the carbon chains of the molecule. If a primary aromatic amine, such as, aniline is reacted with a bis-beta oxyalkyl sulphide, such, as thiodiglycol in the presence of a dehydration catalyst and by heating, a condensation product is obtained having terminal hydroxyl groups if an excess of bis-beta oxyalkyl sulphide is used.

The polycondensation reaction product containing oxygen, sulphur and nitrogen bridges may be produced by heating an oxyalkylated aromatic amine and bis-beta-oxyalkyl sulphide in the presence of a suitable catalyst. The oxygen, nitrogen and sulphur bridges are in juxtaposition to each other in the molecule. The oxyalkylated amines are amines which have one or both hydogen atoms which are attached to the nitrogen atom substituted by an oxyalkyl group. If an oxyalkylated aromatic amine, such as, for example, dioxyethyl-p-toluidene is reacted with thiodiglycol, a high molecular weight condensation reaction product having terminal hydroxyl groups is produced.

The reaction mixture of the bis-beta oxyalkyl sulphide and aromatic amines is heated to a temperature higher than about 120° C. The condensation reaction is accordance with the invention is carried out at a temperature which provides a reasonable reaction velocity. Although at temperatures as low as about 100° C. some reaction may take place, it is preferred to operate at temperatures above about 120° C. It is particularly advantageous to carry out the reaction in the range of from about 150° C. to about 200° C. Temperatures which are considerably higher than about 250° C. are less suitable since these higher temperatures will cause side reactions to take place.

The polycondensation reaction may be carried out and the degree of condensation or the molecular weight of the polycondensation product formed during the reaction may be determined by the amount of water which splits off during the reaction. The molecular weight of the polycondensation product may therefore be controlled by discontinuing the heating of the mixture when the calculated amount of water has been distilled over from the reaction mixture. If desirable the polycondensation reaction may be carried out under vacuum and the water is therefore distilled off under vacuum. It is possible to obtain polycondensation products by the process of the invention having a molecular weight of from about 400 to about 15,000 or higher is desirable. If the polycondensation product contains terminal hydroxyl groups the hydroxyl number may range from a rather negligible amount up to 300 and more. If an excess of an aromatic divalent amine is employed the polycondensation product has terminal primary amino groups. If the reaction starts from an excess of substituted amines the resulting polycondensation product can show secondary amino groups or tertiary amino groups as functional groups at the end of the molecular chain.

The polycondensation products may be linear or branched depending on the amine component used in the condensation. By using a divalent amine as the amine component, polycondensation products are obtained which are linear. If a polyvalent amine is used in a small amount in admixture with the divalent amine a condensation product is obtained which has a certain amount of branching based on the amount of polyvalent amine used. If a condensation product is desired which is cross-linked, then an amine having a high valency is used exclusively as the amine component.

The polycondensation products may be modified by various methods. For example, if it is desired to produce a polycondensation product which is unsaturated, the unsaturated groups may be incorporated into the condensation product having terminal hydroxyl groups by the use of unsaturated aromatic amines in admixture with the amine component. Any suitable unsaturated aromatic amine may be used to incorporate unsaturated groups in the condensation product having teminal hydroxyl groups. By unsaturated aromatic amine is meant an aromatic amine which has an aliphatic substituent having an unsaturated aliphatic group. Compounds having this configuration are, for example, compounds which have the formula:

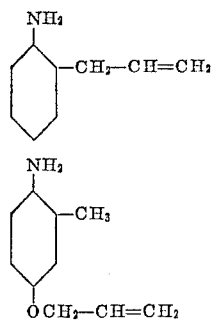

and the like.

The physical properties of the polycondensation products may also be modified by the concurrent use of polyhydric alcohols in the condensation reaction. The use of polyhydric alcohols modifies the physical properties, such as, for example, branching, solubility, viscosity, freezing temperature, and other physical properties of the polycondensation product. Any suitable polyhydric alcohol may be used in admixture with the reaction components. Examples of such suitable polyhydric alcohols are butane diol, diethylene glycol, hexane diol, glycerine, trimethylol propane, hexanetriol, mannitol, pentaerythritol and the like.

In the condensation reaction of the bis-beta-oxyalkyl sulphide and the aromatic amines it has been found desirable to add from about 1 percent to about 2 percent of maleic acid anhydride to the reaction mixture. By adding the maleic acid anhydride to the reaction mixture a condensation product is obtained which is particularly light colored if not completely colorless.

In the condensation reaction of the bis-beta-oxyalkyl sulphide and the aromatic amines it has been found desirable to carry out the condensation reaction in the absence of oxygen. The condensation reaction may be carried out in the absence of oxygen by passing nitrogen or another like inert gas through the reaction mixture as, for example, by bubbling the gas through the mixture or into the reaction container.

The polycondensation products are generally soluble in dilute acids. The polycondensation products on dissolving in the dilute acid form salts. The polycondensation products may form quaternary complexes on the nitrogen and sulphur atoms. These polycondensation compounds may be used in many addition reactions, utilizing the terminal hydroxyl groups or amino groups as well as the hydrogen atoms located in the ortho and para positions of the aromatic nuclei containing the amine group. The amine group activates these hydrogen atoms and causes them to be more reactive. The double bonds which may be incorporated into the condensation product by the use of unsaturated aliphatic aromatic amines may also be used for further reaction.

Any suitable bis-beta-oxyalkyl sulphide or, in other words, bis-beta hydroxy alkyl sulphide may be used in the invention. Examples of such suitable bis-beta-oxyalkyl sulphides are thiodiglycol, 2,2'-dihydroxy dipropyl sulphide, 1,4-(beta-hydroxy ethyl)-phenylene dithioether, corresponding compounds of the naphthalene and diphenyl methane series and the like. Compounds which may also be used are the compounds having the formulae:

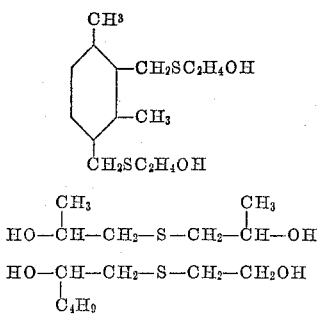

$$HO-\overset{CH_3}{\underset{}{CH}}-CH_2-S-CH_2-\overset{CH_3}{\underset{}{CH}}-OH$$

$$HO-\underset{C_4H_9}{\underset{|}{CH}}-CH_2-S-CH_2-CH_2OH$$

and the like. It is also pointed out that thioglycols having several sulphur atoms in the molecule may be used.

Any suitable monovalent or polyvalent aromatic amine may be used in the invention. Examples of such suitable aromatic amines are ortho-toluidine, meta-toluidine, para-toluidine, ortho-xylidine, meta-xylidine, para-xylidine, ortho-cumidine, meta-cumidine, para-cumidine, ortho-anisidine, meta-anisidine, para-anisidine, ortho-nitroaniline, meta-nitroaniline, para-nitroaniline, ortho-chloro aniline, meta-chloro aniline, para-chloro aniline, ortho-anthranilic acid, meta-anthranilic acid, para-anthranilic acid, ortho-anthranilic acid esters, meta-anthranilic acid esters, para-anthranilic acid esters, p-aminophenol, alpha naphthyl amine, beta-naphthyl amine, ortho-phenylene diamine, meta-phenylene diamine, para-phenylene diamine, 4,4'-diamino diphenyl methane, 2,4-tolylene diamine, 2,6-tolylene diamine, 4,4'-diamine diphenyl sulphide, 4,4'-diamine diphenyl sulphone, benzidine, 3,3'-dichlorobenzidine, 3,3'-dinitrobenzidine and the like. The aromatic amines may be substituted by other substituents as seen by the substituted suitable aromatic amines. By substituting the aromatic amines with substituents such as halogen atoms, nitro groups, alkoxy groups, carboxylic acid groups, sulphonic acid groups and the like, these groups are introduced into the polycondensation product having terminal hydroxy groups.

Substituted amines may also be used in the invention in place of the primary amines. The amines may be used as the hydroxy alkylation products of primary amines. These hydroxyalkylation products may be the monoalkylation or dialkylation products of primary amines. In other words one or both hydrogen atoms of the amino group may be substituted by an alkyl group containing a terminal hydroxyl group. Examples of such suitable monoalkylation products are the amine compounds having the formula:

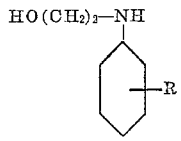

and the like. Examples of such suitable dialkylation products are the compounds characterized by the general formula:

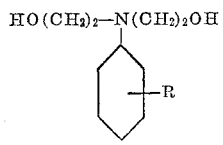

and the like. The R group represents any desired substituent and examples of such suitable groups are seen above as substituents for the aromatic amines. The alkylation products may be produced by oxyalkylation of the free amine group with any suitable alkylene oxide. Examples of such suitable alkylene oxides are ethylene oxide, propylene oxide and the like. The oxyalkylene products which have relatively long alkylene chains may be used as suitable starting materials to react with the bis-beta-oxyalkyl sulphides. The relatively long alkylene chain compounds are those alkylation products which have further reacted with alkylene oxide by the addition type reaction.

The polycondensation reaction with bis-beta oxyalkyl sulphide may also be carried out with secondary amines. Examples of suitable secondary amines are mono-oxyethyl aniline, N,N'-dimethyl p-phenylene diamine and the like.

Any suitable catalyst may be used in the condensation reaction. Suitable catalysts are those catalysts which are termed dehydration catalyst. Examples of such suitable catalysts are aromatic sulphonic acids, such as, p-toluene sulphonic acid, naphthalene sulphonic acid, aromatic sulphonic acid esters such as p-toluene ethyl sulphonate, naphthalene ethyl sulphonate, amido sulphonic acid, sulphuric acid and especially the various phosphoric acids, acid phosphates and organic phosphoric esters, for example ortho-phosphoric acid, meta-phosphoric acid, pyro-phosphoric acid, mono-sodium phosphate, mono-potassium phosphate, triethyl phosphate, trichloroethyl phosphate, diethyl phenyl phosphate.

Any suitable amount of catalysts may be used in the invention, but usually the catalyst is used in an amount from about 0.1 percent to about 10 percent based on the weight of the reactants. The catalysts may be added to either the bis-beta-oxyalkyl sulphide or the amine component or may be added to the mixture of the components prior to heating at elevated temperatures. It is particularly advantageous to use a water-soluble catalyst, which may be removed from the reaction product by washing with water.

The polycondensation products containing nitrogen and sulphur may be used as textile auxiliaries or as intermediate products for the product of plastics. The polycondensation products having terminal hydroxyl groups may be reacted with organic polyisocyanates to form polyurethane plastics. The polyurethane plastics may be used to produce coatings, impregnations, rubber-like materials which may be used in making vehicle tires or elastic and rigid cellular polyurethanes which may be used in making sponges, cushions and insulation. Preferably the polycondensation products having terminal hydroxyl groups should have a molecular weight of at least 800 and may even be as high as 10,000 or more.

In order to better describe and further clarify the invention, the following are specific embodiments thereof:

*Example 1*

About 1220 grams of thiodiglycol (about 10 mols) are heated with about 930 grams of aniline (about 10 mols) to a temperature of from about 180° C. to about 190° C. while adding about 2 percent of orthophosphoric acid as a catalyst. The reaction mixture is stirred well and nitrogen gas is introduced into the mixture by bubbling. Care is taken that no aniline is entrained with the water which is violently split off and distilled over. After about 300 cc. of water have been distilled off, the condensation is continued for from about 3 to about 4 hours in vacuo. The viscosity of the reaction mixture rises very considerably. A polycondensation product having terminal hydroxyl groups and an OH number of about 56 is obtained with a yield of 94 percent of the theoretical. The polycondensation product has a corresponding molecular weight of about 2000. The polycondensation product is a viscous brown resin having an oxygen content of about 1.6 percent. The oxygen content corresponds exactly to the percentage content calculated on the OH number which shows that no ether-oxygen atoms are present in the chain.

*Example 2*

About 1220 grams of thiodiglycol are condensed with about 1810 grams (about 10 mols) of dioxyethyl aniline according to the process of Example 1. The reaction product is a viscous reddish brown resin. The yield is very high as the reaction product showed a yield of 96% of the theoretical. The reaction product has an OH number of about 48 and is readily soluble in about 10 percent hydrochloric acid as well as in the conventional organic solvents. The average molecular weight is about 2200.

In place of the bis-oxyethyl aniline, it is possible to use monooxyethylene aniline in the condensation reaction. In using the monooxyethylene aniline the condensation takes place through the OH groups and a direct alkylation occurring on the nitrogen atom.

*Example 3*

About equimolar quantities of thiodiglycol and m-chloraniline are condensed according to the process of Example 1. A reaction product is produced having a yield of about 93 percent of the theoretical. The reaction product is a viscous brown resin having an OH number of about 62 and a molecular weight of about 1800.

*Example 4*

A branched polycondensation product is produced by reacting about 2240 grams of thiodiglycol, about 465 grams of aniline and about 990 grams of 4,4'-diamino-diphenyl methane. The reactants are condensed for about 5 hours at a temperature of about 180° C. with the addition of about 2 percent phosphoric acid based on the weight of the reactants. The condensation reaction is then continued in vacuo until the reaction product has an OH number of about 250. A reaction product is obtained having a yield of about 90 percent of the theoretical. The reaction product is a viscous liquid resin when it is hot and a hard mass when it is cold. The reaction product is soluble in the conventional organic solvents. The average molecular weight is about 800.

*Example 5*

A branched polycondensation product is obtained if about 1220 grams of thiodiglycol, about 134 grams of trimethylol propane, about 150 grams of triethylene glycol and about 107 grams of m-toluidine are condensed at a temperature of about 190° C. according to the process described in Example 4 with the addition of about 0.8 percent of phosphoric acid and about 2 percent of maleic acid anhydride based on the weight of the reactants. A reaction product is formed having a yield of about 92 percent based on the theoretical. The reaction product is a thickly viscous light brown liquid having an OH number of about 180 and a molecular weight of about 900.

It is to be understood that any of the bis-beta-oxyalkyl sulphides or aromatic substituted or unsubstituted amines or polyhydroxy alcohols or catalyst disclosed as operable herein may be substituted in the foregoing working examples for those specific compounds used.

Although the invention has been described in considerable detail in the foregoing examples for the purpose of illustration, it is to be understood that such detail is solely for this purpose and that variations may be made therein by those skilled in the art without departing from the spirit and scope of the invention except as is set forth in the claims.

*Example 6*

1000 grams of a polycondensation product prepared according to Example 1 and having an OH number of 63 are mixed with 190 grams of 1.5-naphthylene-diisocyanate at 124° C. Reaction is finished after 9 minutes. Then, 21 grams of 1.4-butylene glycol are stirred into the mixture. The reaction product is poured into waxed molds, heated to 110° C., the molding is taken from the mold after 20 minutes and cured for 24 hours at 100° C. An elastic material is obtained with excellent abrasion resistance. Solidification temperature: —50° C.

*Example 7*

100 grams of a polycondensation product prepared according to Example 3 and having an OH number of 73 are mixed with 3 grams of bis-N-diethyl ethanol amine adipate, 2 grams of diethyl amine oleate and 1.5 grams of water. 29 grams of a technical mixture of 70% of 2.4- and 30% of 2.6-tolylene diisocyanate are then added. After intimately mixing the mixture begins to expand and cures to give a semi-elastic foamed product.

What is claimed is:

1. In the preparation of a condensation product containing nitrogen and sulphur bridges by condensing an amine with a bis-beta hydroxy alkyl sulphide, the process which comprises condensing an aromatic amine having at least one nitrogen atom attached to a member selected from the group consisting of hydrogen and an hydroxy substituted alkyl group with said sulphide at a temperature above about 120° C.

2. In the preparation of a condensation product containing nitrogen and sulphur bridges by condensing an amine with a bis-beta hydroxy alkyl sulphide, the process which comprises condensing an aromatic primary amine with said sulphide while mixed with a catalytic amount of dehydration catalyst at a temperature above about 120° C.

3. In the preparation of a condensation product containing nitrogen and sulphur bridges by condensing an amine with a bis-beta hydroxy alkyl sulphide, the process which comprises condensing an aromatic secondary amine with said sulphide while mixed with a catalytic amount of dehydration catalyst at a temperature above about 120° C.

4. In the preparation of a condensation product containing nitrogen and sulphur bridges by condensing an amine with a bis-beta hydroxy alkyl sulphide, the process which comprises condensing an aromatic tertiary amine having at least one hydroxy substituted alkyl group with said sulphide while mixed with a catalytic amount of dehydration catalyst at a temperature of above about 120° C.

5. In the preparation of a condensation product containing nitrogen and sulphur bridges by condensing an amine with a bis-beta hydroxy alkyl sulphide, the process which comprises condensing an aromatic amine having at least one nitrogen atom attached to a member selected from the group consisting of hydrogen and an hydroxy substituted alkyl group with said sulphide while mixed with from about 0.1 percent to about 10 percent by weight of a dehydration catalyst at a temperature of above about 120° C.

6. In the preparation of a condensation product containing nitrogen and sulphur bridges by condensing an amine with a bis-beta hydroxy alkyl sulphide, the process which comprises condensing an aromatic amine selected from the group consisting of primary, secondary and tertiary amines, said tertiary amines containing at least one nitrogen atom attached to a member selected from the group consisting of hydrogen and an hydroxy substituted alkyl group with said sulphide while mixed with from about 0.1 percent to about 10 percent by weight of a dehydration catalyst at a temperature above about 120° C.

7. In the preparation of a condensation product containing nitrogen and sulphur bridges by condensing an amine with a bis-beta hydroxy alkyl sulphide, the process which comprises condensing an aromatic amine having at least one nitrogen atom attached to a member selected from the group consisting of hydrogen and an hydroxy substituted alkyl group with said sulphide while mixed with from about 0.1 percent to about 10 percent by weight of a catalytic amount of dehydration catalyst at a temperature ranging from about 150° C. to about 200° C.

8. In the preparation of a condensation product containing nitrogen and sulphur bridges by condensing an amine with a bis-beta hydroxy alkyl sulphide, the process which comprises condensing an aromatic amine having at least one nitrogen atom attached to a member selected from the group consisting of hydrogen and an hydroxy substituted alkyl group with said sulphide while mixed with from about 0.1 percent to about 10 percent of phosphoric acid at a temperature ranging from about 150° C. to about 200° C.

9. In the preparation of a condensation product containing nitrogen and sulphur bridges by condensing an amine with a bis-beta hydroxy alkyl sulphide, the process which comprises condensing an aromatic amine having at least one nitrogen atom attached to a member selected from the group consisting of hydrogen and an hydroxy substituted alkyl group with said sulphide while mixed with from about 0.1 percent to about 10 percent of an organic phosphoric acid ester at a temperature ranging from about 150° C. to about 200° C.

10. In the preparation of a condensation product containing nitrogen and sulphur bridges by condensing an amine with a bis-beta hydroxy alkyl sulphide, the process which comprises condensing an aromatic amine having at least one nitrogen atom attached to a member selected from the group consisting of hydrogen and an hydroxy substituted alkyl group with said sulphide while mixed with from about 0.1 percent to about 10 percent of an acid phosphoric acid salt at a temperature ranging from about 150° C. to about 200° C.

11. In the preparation of a condensation product containing nitrogen and sulphur bridges by condensing an amine with a bis-beta hydroxy alkyl sulphide, the process which comprises condensing an aromatic amine having at least one nitrogen atom attached to a member selected from the group consisting of hydrogen and an hydroxy substituted alkyl group and a saturated polyhydric alcohol with said sulphide while mixed with a dehydration catalyst at a temperature above about 120° C.

12. A condensation product containing nitrogen and sulphur bridges and having terminal hydroxyl groups which is produced by condensing an aromatic amine having at least one nitrogen atom attached to a member selected from the group consisting of hydrogen and an hydroxy substituted alkyl group with a bis-beta hydroxy alkyl sulphide while mixed with a dehydration catalyst at a temperature above about 120° C.

13. A condensation product containing nitrogen and sulphur bridges and having terminal hydroxyl groups which is produced by condensing an amine having at least one nitrogen atom attached to a member selected from the group consisting of hydrogen and an hydroxy substituted alkyl group and a saturated polyhydric alcohol with a bis-beta hydroxy alkyl sulphide while mixed with a dehydration catalyst.

14. The process of claim 1 wherein the amount of aromatic amine exceeds the amount of sulphide and the product thereby has terminal amino groups.

No references cited.